United States Patent [19]
Viano et al.

[11] Patent Number: 5,741,989
[45] Date of Patent: Apr. 21, 1998

[54] LOWER LEG FOR CRASH TEST DUMMY

[75] Inventors: David C. Viano, Bloomfield Hills; Edward A. Jedrzejczak, Brown City; Joseph G. Smrcka, Northville, all of Mich.

[73] Assignee: First Technology Safety Systems, Inc., Plymouth, Mich.

[21] Appl. No.: 757,514

[22] Filed: Nov. 27, 1996

Related U.S. Application Data

[62] Division of Ser. No. 331,282, Oct. 28, 1994, Pat. No. 5,589,651.

[51] Int. Cl.$^6$ ................................................ G01N 33/00
[52] U.S. Cl. ............................................................ 73/866.4
[58] Field of Search ............................ 73/865.6, 866.4, 73/862.541, 7, 865.1, 865.2, 865.3; 434/267, 274, 275, 269; 446/381, 383, 390; 116/203

[56] References Cited

U.S. PATENT DOCUMENTS

| | | |
|---|---|---|
| 1,882,575 | 10/1932 | Hanks . |
| 3,762,069 | 10/1973 | Culver . |
| 3,841,163 | 10/1974 | Daniel . |
| 4,274,224 | 6/1981 | Pugh et al. . |
| 4,349,339 | 9/1982 | Daniel . |
| 4,488,433 | 12/1984 | Denton et al. . |
| 4,701,132 | 10/1987 | Groesch et al. . |
| 5,116,383 | 5/1992 | Shorter et al. ............... 623/53 |

OTHER PUBLICATIONS

*Anthropomorphic Test Devices, Hybrid III, 5th Percentile Small Female Dummy*, First Technology Safety Systems, Inc., 2 pages, 1992, U.S.A.
*Anthropomorphic Test Devices, Hybrid III, 50th Percentile Male Test Dummy*, First Technology Safety Systems, Inc., 2 pages, 1992, U.S.A.
*Anthropomorphic Test Devices, Hybrid III, 95th Percentile Large Male Test Dummy*, First Technology Safety Systems, Inc., 2 pages, 1992, U.S.A.
*Anthropomorphic Test Devices, Hybrid II, 50th Percentile Male Test Dummy*, First Technology Safety Systems, Inc., 2 pages, 1992, U.S.A.
*Anthropomorphic Test Devices, Side Impact Dummy*, First Technology Safety Systems, Inc., 2 pages, 1992, U.S.A.
*Anthropomorphic Test Devices, Biofidelic Side Impact Dummy*, First Technology Safety Systems, Inc., 2 pages, 1992, U.S.A.
*Infant Dummy Model CAMI–II*, First Technology Safety Systems, Inc. 1 page, 1993, U.S.A.
*Anthropomorphic Test Devices, CRABI Six–month Old Infant Dummy*, First Technology Safety Systems, Inc. 2 pages, 1991, U.S.A.
*Anthropomorphic Test Devices, Three–year Old Child Dummy*, First Technology Safety Systems, Inc. 2 pages, 1992, U.S.A.
*Anthropomorphic Test Devices, Six–year Old Child Dummy*, First Technology Safety Systems, Inc. 2 pages, 1992, U.S.A.

*Primary Examiner*—Robert Raevis
*Attorney, Agent, or Firm*—William J. Clemens

[57] ABSTRACT

A lower leg assembly includes laceration indicators at a knee joint and at a front of a tibia. The tibia is connected to a thigh of a dummy by a pivot arm and a potentiometer is provided for measuring relative motion between the tibia and the pivot arm. A damper is positioned between the tibia and the pivot arm. A load cell is connected between the tibia and a lower leg to ankle connector. The connector is pivotally connected to an ankle joint and the ankle joint has a ball which cooperates with a socket formed in a foot assembly to simulate the range of motion of a human foot-ankle joint. Cushions are provided at the connector to ankle joint connection and the ball to socket connection to return the ankle and foot to a neutral position.

5 Claims, 3 Drawing Sheets

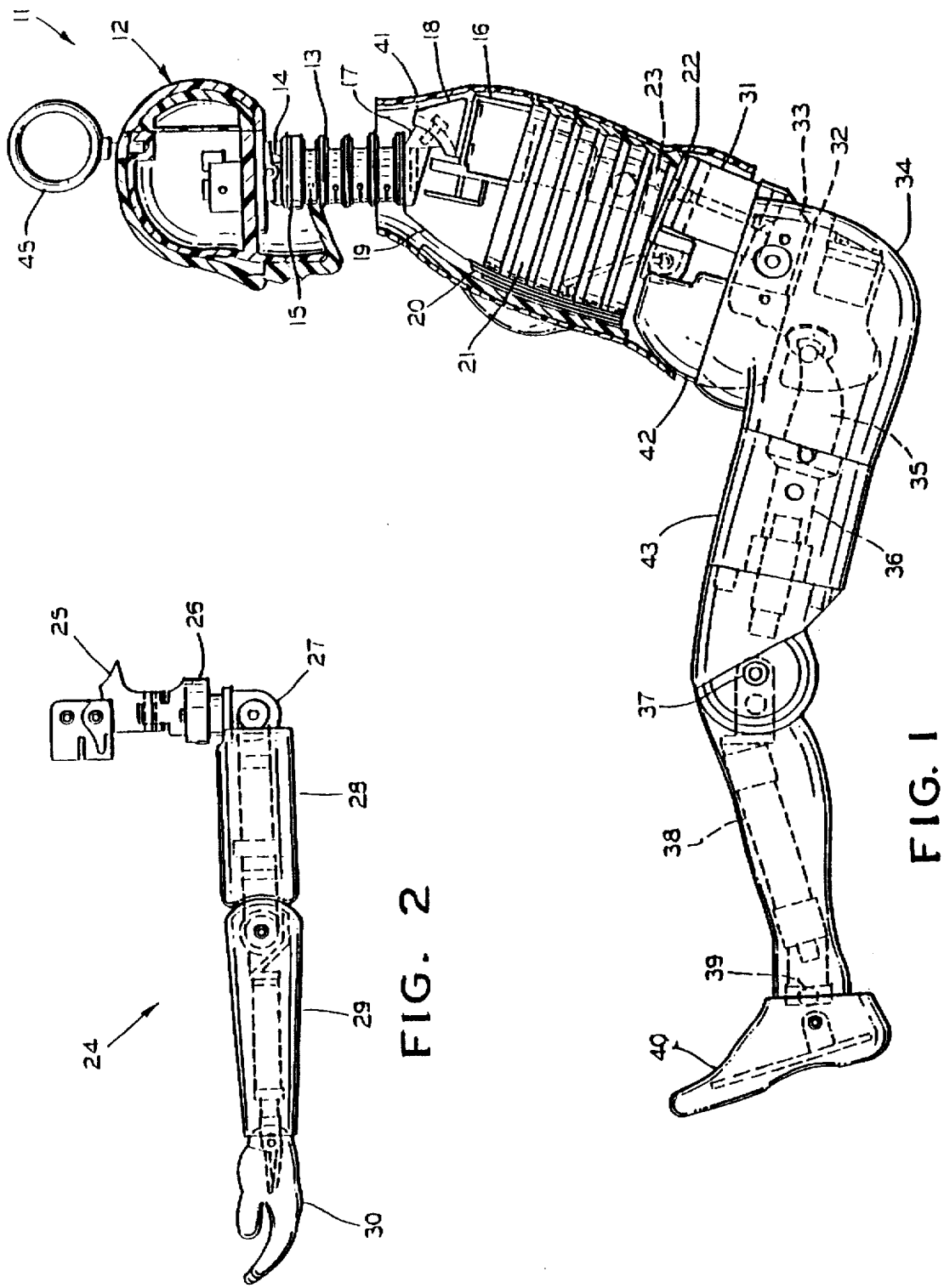

LOWER LEG FOR CRASH TEST DUMMY

This is a divisional of application Ser. No. 08/331,282, filed on Oct. 28, 1994, now U.S. Pat. No. 5,589,651.

BACKGROUND OF THE INVENTION

The present invention relates generally to anthropomorphic test dummies of the type utilized for aviation and automotive crash research and, in particular, to a lower leg assembly for such a dummy.

Test dummies are a very important tool for use in evaluating the crashworthiness of vehicles. In fact, such dummies have become the stars of television, radio and print media advertisements. In the field of automotive crash test research, various types of dummies have been developed to represent a range of sizes of adults and children associated with the human population.

A full line of anthropomorphic test dummies is available from First Technology Safety Systems, Inc. of Plymouth, Mich. Included in the line are a BioSID side impact test dummy, Hybrid III test dummies in ninety-fifth percentile male, fifth percentile female, and fiftieth percentile configurations, a Side Impact model 572-SID test dummy, a Hybrid II fiftieth percentile test dummy, six-year-old and three-year-old child test dummies, a three-year-old airbag test dummy, a model CAMI-II infant test dummy, and VIP model test dummies in ninety-fifth and fifth percentile configurations.

The BioSID test dummy utilizes Hybrid III head, neck and leg assemblies and six ribs which are an adaptation of the Hybrid III design constructed from vascomax steel and oriented 90° so that the faces of the ribs are turned toward the area of impact. The BioSID pelvis is capable of accepting a pubic and sacrum load cell. The Hybrid III ninety-fifth percentile male and the Hybrid III fifth percentile female test dummies include a three- or six-axis neck transducer, submarining indicator pelvis, chest displacement transducer, tibia-femur displacement transducers and mounts for head, chest and pelvis accelerometers. The Hybrid III fiftieth percentile test dummy eliminates the submarining indicator pelvis used on the other Hybrid III dummies and meets the specifications for the FMVSS 208 option specified in 49 CFR Part 572 Subpart E.

The Side Impact model 572-SID test dummy meets the specifications for the FMVSS 208 standard specified in 49 CFR Part 572 Subpart F utilizing Hybrid II head, neck and lower leg assemblies with upper and lower torso assemblies designed for side impacts. The Hybrid II fiftieth percentile test dummy meets the specifications for the FMVSS 208 standard specified in 49 CFR Part 572 Subpart B including mounts for head, chest and pelvis accelerometers.

The six-year-old child test dummy meets the specifications for the proposed FMVSS 208 standard and includes mounts for head, chest and pelvis accelerometers. The three-year-old test dummy meets the specifications for the FMVSS 213 standard specified in 49 CFR Part 572 Subpart C and includes mounts for head and chest accelerometers.

The three-year-old child airbag test dummy is of an experimental sit/stand construction. The infant test dummy meets the specifications for the FMVSS 213 standard specified in 49 CFR Part 572 Subpart D, and includes mounts for head, chest and pelvis accelerometers. The VIP test dummies include mounts in the head and chest for accelerometers.

General Motors has an active safety research program which includes the development of new information relevant to the safety of the family of vehicle occupants. The basic research on crash injury mechanisms, impact responses and human tolerances has led to the development of new high-fidelity test dummies and injury assessment procedures that refine the evaluation of crash protection for adults and children. This research led to the Hybrid III dummy which has biomechanical fidelity in mimicking the essential response of the human to crash loads. Additional studies have improved the realism of test tools and assessment procedures for head, face, chest, abdominal and extremity injuries which are used by all manufacturers worldwide. The culmination of that research has been prototype dummies and concepts which form the basis for partnerships with dummy suppliers, such as First Technology Safety Systems.

The epidemiology of recent crash injuries clearly demonstrates the substantial advances in survivability of very severe crashes, but also points out the priority areas of current injury. Deep lacerations and fractures of the lower leg are an important accident injury having potentially long term consequences including extended periods of disability. Recent studies on the long term consequences of injuries in motor-vehicle crashes reveal the importance of limb injuries to disability. In particular, soft tissue injuries in the knee, ankle and hip joints represent the largest fraction of the societal costs of injury and exceed brain and spinal cord injury disabilities in aggregate costs.

In the instant situation, General Motors developed the concept for an advanced lower leg with laceration indicators to be used with the Hybrid III dummies to assess the protection of the lower legs in highway crashes. The basic concept development, anthropometry and prototype hardware were developed by GM. As the concept proved feasible, First Technology Safety Systems became a partner in the final prototype development by adding its extensive experience and expertise on test dummies in a cooperative, innovative program. The final crash test dummy lower leg design realizes the joint development of an initial GM concept.

SUMMARY OF THE INVENTION

The present invention concerns a lower leg assembly for a crash test dummy including a tibia having an upper end for pivotally connecting to a lower end of a thigh bone of the dummy, a lower end for connecting to a foot assembly of the dummy and a front surface extending between the upper and lower ends of the tibia. A lower leg skin has an interior space surrounded by an inner wall for retaining the tibia and a leg laceration indicator is retained in the interior space between the inner wall and the front surface. The leg laceration indicator is deformed by forces applied to a portion of the lower leg skin abutting the leg laceration indicator. A thigh skin covers the thigh bone and an upper end of a pivot arm connected between the tibia and the thigh bone. A knee laceration indicator is retained between the end of the thigh, bone and the thigh skin and is deformed by forces applied to a portion of the thigh skin abutting the knee laceration indicator.

A damper is connected between the tibia and the pivot arm. A pin is attached to the lower end of the pivot arm and is pivotally connected to the upper end of the tibia. A potentiometer is mounted on the tibia and has a rotatable shaft connected to the pin for generating an output signal representing relative rotation between the pivot arm and the tibia. A load cell is connected to the lower end of the tibia and has means for connection to the foot assembly for generating an output signal representing forces applied to the tibia.

A linking element is connected between the lower end of the tibia and an ankle joint having a ball on a lower end thereof. The foot assembly has a socket for retaining the ball whereby the ball and socket cooperate to simulate a range of motion of a human foot-ankle joint.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a side elevation view of a prior art female test dummy of a sit construction;

FIG. 2 is a top plan view of a left arm used with the dummy shown in the FIG. 1;

DESCRIPTION OF THE PREFERRED EMBODIMENT

Figure 3:
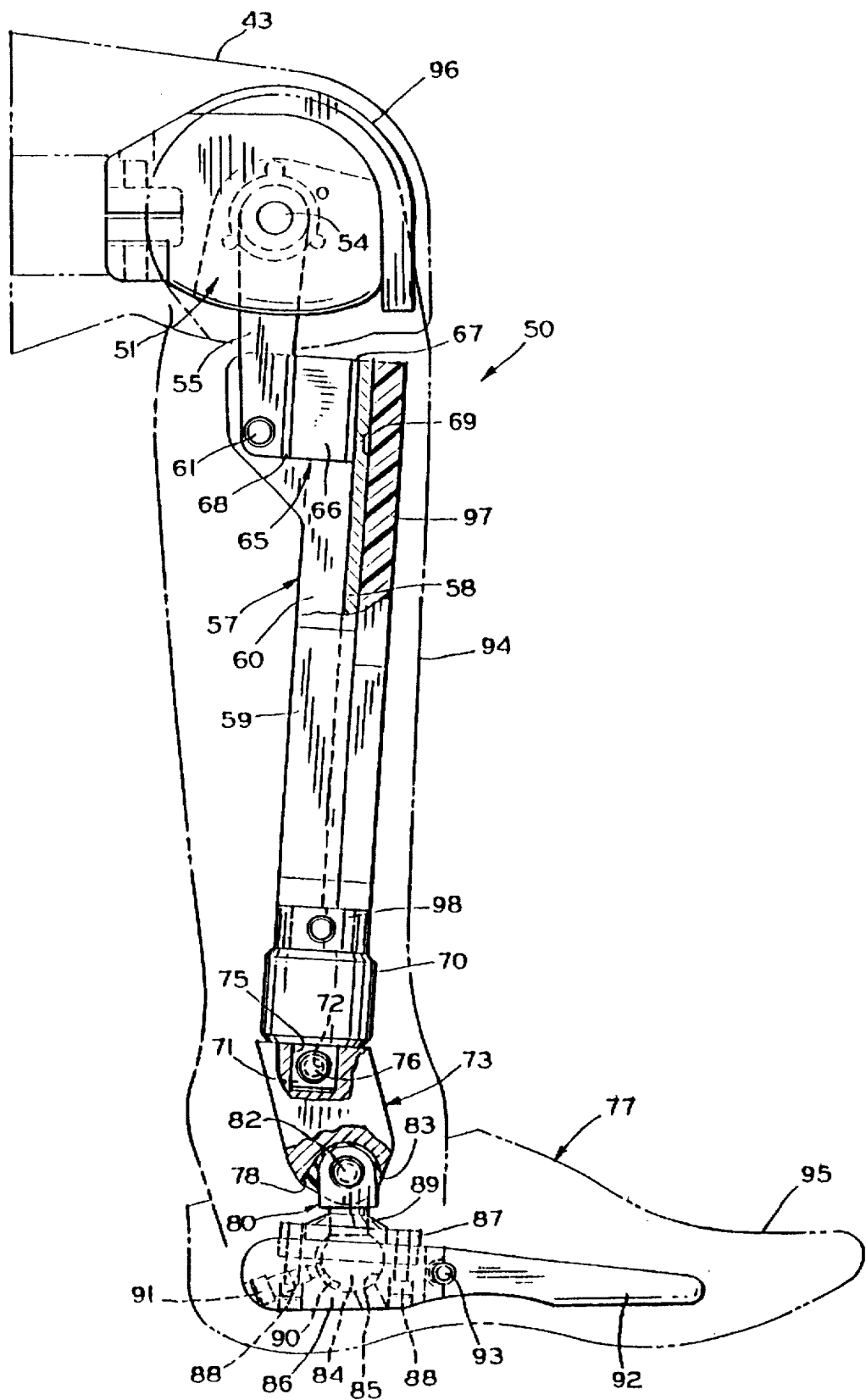
FIG. 3 is side elevation view of the preferred embodiment of the lower leg for use with the crash test dummy of FIG. 1.

In the FIG. 1 there is shown a crash test dummy 11 of the Hybrid III fifth percentile female type in a sitting position. This dummy is used primarily to test the performance of automotive interiors and restraint systems for very small adult front and rear seat occupants. The size and weight of the test dummy 11 are based on anthropometric studies by the Human Biomechanics and Simulation Standards Committee Task Force of the Society of Automotive Engineers and represent the lower extreme of the USA adult population. Ranges of motions, centers of gravity and segment masses simulate those of human subjects defined by the anthropometric data.

The dummy 11 has a head assembly 12 which is shown in cross-section and includes a one-piece cast aluminum skull and one-piece skull cap both covered by a vinyl skin. The skull cap is removable for access to head instrumentation contained inside the head assembly 12. The head assembly 12 is mounted at the top end of a neck assembly 13 by a nodding block 14 and a nodding joint 15. A lower end of the neck assembly 13 extends into a torso area of the dummy 11 and is connected to an upper end of a thoracic spine 16 by an upper neck bracket 17 connected to a lower neck bracket 18. The torso area of the dummy 11 is shown in cross-section to reveal a bib assembly 19 having an upper end connected to the upper neck bracket 17 and a lower end connected to a sternum assembly 20. A rib set 21 has a plurality of ribs connected between the sternum assembly 20 and the thoracic spine 16. The lower end of the spine 16 is connected to a spine mounting weldment 22 by an adapter assembly 23.

The dummy 11 shown in the FIG. 1 also has a pair of arm assemblies including a right arm assembly which is hidden from view and a left arm assembly which has been removed to reveal the interior of the torso. There is shown in the FIG. 2 a left arm assembly 24 representing both the left and fight arms which are attached to the test dummy 11. The arm assembly 24 includes a clavicle link 25 which connects a clavicle 26 to the top of the thoracic spine 16. The clavicle 26 is connected to a shoulder yoke 27 which in turn is connected to an upper end of an upper arm assembly 28. A lower end of the upper arm assembly 28 is connected to an upper end of a lower arm assembly 29. A lower end of the lower arm assembly 29 is connected to a left hand assembly 30. The fight arm assembly is constructed in a similar manner.

As shown in the FIG. 1, the spine mounting weldment 22 is connected to an upper end of a lumbar spine 31. A lower end of the lumbar spine 31 is connected to a lumbar-thoracic adapter 32 which is connected to a lumbar to pelvic adapter 33. A pelvis assembly 34 is connected to the adapter 33. A femur and flange assembly 35 for a left leg has one end connected to the pelvis assembly 34. An opposite end of the assembly 35 is connected to a thigh bone 36 having an opposite end connected to a sliding knee assembly 37. One end of a tibia 38 is connected to the knee assembly 37 and an opposite end is connected to an ankle rotation assembly 39. The ankle rotation assembly 39 is connected to a left foot 40. Although only a left leg is shown, a fight leg is similar in construction.

The various components of the test dummy 11 are covered in a vinyl skin such as the chest flesh and skin assembly 41 which extends from the lower end of the neck assembly 13 to a central portion of the lumbar spine 31. A lower end of the chest flesh and skin assembly 41 partially covers an upper portion of an abdominal insert 42 positioned in the lower torso. A lower portion of the abdominal insert 42 is covered by an upper portion of the pelvis assembly 34. A thigh flesh and skin 43 covers the thigh bone 36 and a lower leg flesh/skin 44 covers the portion of the leg between the knee and the foot. A lifting ring 45 is attached to the head assembly 12 for lifting the test dummy 11 into and out of test fixtures and vehicles.

Figure 4:
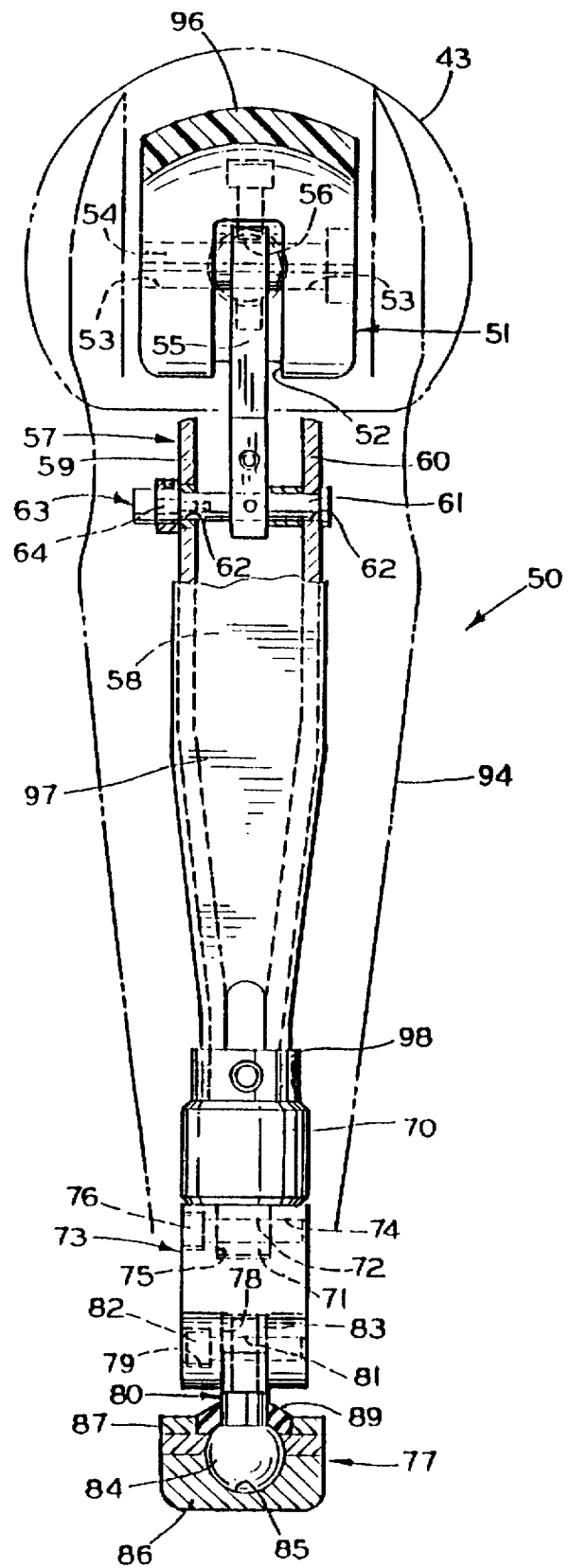
FIG. 4 is a front elevation view of the lower leg of FIG. 3.

In accordance with the preferred embodiment of the present invention, an improved lower leg assembly 50 for use with the crash test dummy 11 of the FIG. 1 is shown in the FIGS. 3 and 4. It will be understood that although the present invention is described with respect to use with the Hybrid III fifth percentile female type dummy 11, the lower leg 50 is suitable for crash test dummies generally and Hybrid III test dummies in particular.

The lower leg 50 includes a knee assembly 51 which can be connected to the thigh bone 36 of the dummy 11. An end of the thigh bone 36 has a central groove 52 formed therein and a pair of transverse apertures 53 for retaining a knee joint pivot pin 54. An upper end of a pivot arm 55 extends into the groove 52 and has an aperture 56 formed therein for receiving the pin 54 whereby the arm 55 is pivotally connected to the thigh bone 36. A longitudinally extending tibia 57 has a generally U-shaped cross section with a front wall 58, and a left side wall 59 and a fight side wall 60 extending rearwardly from opposite edges of the front wall. The walls 58, 59 and 60 define a longitudinally extending cavity opening toward the rear of the tibia 57. A lower end of the pivot arm 55 extends into an upper end of the cavity in the tibia 57 and is connected to a central portion of a knee shear pivot pin 61. Opposite ends of the knee shear pivot pin 61 extend through apertures 62 formed in the side walls 59 and 60 to provide a pivot point for the tibia 57. A potentiometer 63 (FIG. 4) is mounted on an outer surface of the side wall 60 and has a rotatable shaft 64 connected to the adjacent end of the pin 61. The potentiometer 63 generates an output signal proportional to the rotation of the tibia 57 with respect to the pivot arm 55.

As shown in the FIG. 4, a damper 65 includes a central portion 66 formed of a resilient material such as rubber secured between a front plate 67 and a rear plate 68 with an adhesive or other suitable means. The damper 65 is disposed within the upper end of the cavity in the tibia 57 with the front plate 67 secured to the front wall 58 with fasteners 69 such as screws. The rear plate 68 is secured in a similar fashion to a lower end of a front edge of the pivot arm 55.

A lower end of the tibia 57 has a load cell 70 attached thereto for generating an output signal proportional to the force applied to the tibia 57 in a longitudinal direction. A lower end of the load cell 70 includes a downwardly extending linking element 71 having a transverse aperture 72 formed therein. A lower leg to ankle connector 73 has a transverse aperture 74 and a recess 75 formed therein. The recess 75 interrupts a central portion of the aperture 74 for receiving the linking element 71. The linking element 71 is retained within the recess 75 by a fastener 76 which extends through the apertures 72 and 74 and can threadably engage one end of the aperture 74.

A lower end of the connector 73 is connected to a foot assembly 77. A groove 78 is formed in the lower end of the connector 73 and an aperture 79 extends through the groove between opposed outer surfaces of the ankle bone. An ankle joint 80 has an aperture 81 formed in an upper end thereof. The upper end of the ankle joint is retained in the groove 78 by a fastener 82 inserted into the apertures 79 and 81 and threadably engaging one end of the aperture 79. A space between the upper end of the ankle joint 80 and the walls of the groove 78 is filled with a cushion 83 formed of a resilient material which returns the ankle joint 80 to a neutral position shown in the FIG. 3 after it has been rotated about the fastener 82. A ball 84 is formed on a lower end of the ankle joint 80 and is disposed within a complementary socket 85 formed in a rear portion 86 of the foot assembly 77. The ball 84 and the socket 85 cooperate to form a subtalar joint with a range of motion simulating a human foot-ankle joint.

The ball 84 is held in the socket 85 by a retainer 87 which is attached to the rear portion 86 by suitable fasteners 88. A central portion of the ankle joint 80 extends through an aperture formed in the retainer 87 and is spaced from a wall of the aperture by a cushion 89 formed of a resilient material. The cushion 89 returns the ankle joint 80 to a neutral position shown in the FIG. 3 after the joint has been moved. The ball 84 has a groove 90 formed therein which extends over a portion of its surface. A ball guide screw 91 is threadably retained in the rear portion 86 and extends into the groove 90 to limit the rotation of the ball 84 in the socket 85. The rear portion 86 is pivotally connected to a front portion 92 of the foot assembly 77 by a hinge pin 93.

The thigh bone 36 and the knee assembly 51 are covered by the thigh flesh and skin 43. Similarly, a lower leg flesh/skin 94 replaces the standard lower leg flesh/skin 44 shown in the FIG. 1 and has an interior space formed therein for receiving the tibia 57. The foot assembly 77 is covered by foot flesh and skin 95. Inserted between the skin 43 and the knee assembly 51 at the front of the knee is a knee laceration indicator 96. Inserted between the skin 94 and the tibia 57 at the front of the lower leg is a leg laceration indicator 97. The indicator 97 slides between an outer surface of the front wall 58 and an inner surface of the skin 94 and a lower end of the indicator rests on an upper surface of a connector 98 which attaches the tibia 57 to the load cell 70. The indicators 96 and 97 are formed of a material which can be lacerated, punctured, and inelastically deformed in response to forces applied to the lower leg assembly during a crash test.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A lower leg assembly for a crash test dummy having a thigh bone comprising:

a tibia having an upper end for coupling to a lower end of a thigh bone of a crash test dummy and a lower end;

a lower leg to ankle connector connected to said lower end of said tibia and having a lower end;

an ankle joint having an upper end pivotally connected to said lower end of said lower leg to ankle connector for pivoting about an axis transverse to a longitudinal axis of said ankle joint and having a ball on a lower end thereof; and a foot assembly having a socket for retaining said ball whereby said ball and socket cooperate to simulate a range of motion of a human foot-ankle joint.

2. The lower leg assembly according to claim 1 wherein said foot assembly includes a rear portion having said socket formed therein, a front portion and a pin pivotally connecting said rear portion to said front portion.

3. The lower leg assembly according to claim 1 including a retainer attached to said foot assembly and covering said socket, said retainer having an aperture formed therein, said ankle joint extending through said aperture, and a cushion retained in said aperture and surrounding a portion of said ankle joint whereby said foot assembly is urged to a neutral position.

4. The lower leg assembly according to claim 1 wherein said lower leg to ankle connector has a groove formed in said lower end thereof and said ankle joint upper end is pivotally retained in said groove and including a cushion retained in said groove and surrounding said upper end of said ankle joint whereby said ankle joint is urged to a neutral position.

5. A lower leg assembly for a crash test dummy having a thigh bone comprising:

a tibia having an upper end for coupling to a lower end of a thigh bone of a crash test dummy and a lower end;

a lower leg to ankle connector connected to said lower end of said tibia and having a lower end;

an ankle joint pivotally connected to said lower end of said lower leg to ankle connector and having a ball on a lower end thereof, said lower leg to ankle connector having a groove formed in said lower end thereof and said ankle joint having an upper end pivotally retained in said groove;

a cushion retained in said groove and surrounding said upper end of said ankle joint for urging said ankle joint to a neutral position; and a foot assembly having a socket for retaining said ball whereby said ball and socket cooperate to simulate a range of motion of a human foot-ankle joint.

* * * * *